United States Patent
Minokuchi et al.

(10) Patent No.: US 12,058,580 B2
(45) Date of Patent: Aug. 6, 2024

(54) ACCESS CONTROL APPARATUS AND USER PLANE APPARATUS

(71) Applicant: NTT DOCOMO, INC., Tokyo (JP)

(72) Inventors: Atsushi Minokuchi, Tokyo (JP); Riccardo Guerzoni, Munich (DE); Malla Reddy Sama, Munich (DE); Jari Mutikainen, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/764,444

(22) PCT Filed: Oct. 4, 2019

(86) PCT No.: PCT/JP2019/039405
§ 371 (c)(1),
(2) Date: Mar. 28, 2022

(87) PCT Pub. No.: WO2021/065012
PCT Pub. Date: Apr. 8, 2021

(65) Prior Publication Data
US 2022/0394580 A1  Dec. 8, 2022

(51) Int. Cl.
*H04W 36/02* (2009.01)
*H04W 36/12* (2009.01)

(52) U.S. Cl.
CPC .......... *H04W 36/12* (2013.01); *H04W 36/02* (2013.01)

(58) Field of Classification Search
CPC ........ H04B 1/7183; H04B 2201/71634; H04B 17/364; H04W 56/0045; H04W 56/009; H04W 56/00; H04W 4/02; H04W 4/40; H04W 52/36; H04W 74/0841; H04W 52/146; H04W 52/50; H04W 74/0833; H04W 74/08; H04W 52/04; H04W 52/14; H04W 36/02; H04W 36/12; H04W 40/36; H04W 36/0011; H04W 36/023; G01S 11/02; G01S 13/74; G01S 13/76; B60R 25/00

See application file for complete search history.

(56) References Cited

U.S. PATENT DOCUMENTS

| | | | |
|---|---|---|---|
| 10,708,824 B2* | 7/2020 | Lee | H04W 36/0016 |
| 2017/0347295 A1* | 11/2017 | Rune | H04W 36/0033 |
| 2018/0242204 A1* | 8/2018 | Zhu | H04W 76/11 |
| 2018/0270721 A1* | 9/2018 | Cui | H04W 36/13 |

(Continued)

FOREIGN PATENT DOCUMENTS

| | | |
|---|---|---|
| EP | 3355615 A1 | 8/2018 |
| WO | 2016101974 A1 | 6/2016 |

OTHER PUBLICATIONS

International Search Report issued in PCT/JP2019/039405 on Apr. 14, 2020 (5 pages).

(Continued)

*Primary Examiner* — Nathan S Taylor
(74) *Attorney, Agent, or Firm* — Osha Bergman Watanabe & Burton LLP

(57) ABSTRACT

An access control apparatus including: a reception unit; and a control unit configured to store, in a buffer, data transmitted from a terminal from when the reception unit receives a first message indicating that an application server is to be switched until when the reception unit receives a second message indicating move completion of an application context.

4 Claims, 10 Drawing Sheets

(56) References Cited

U.S. PATENT DOCUMENTS

| | | | |
|---|---|---|---|
| 2019/0053108 A1* | 2/2019 | Trang | H04W 36/0033 |
| 2019/0274185 A1* | 9/2019 | Stojanovski | H04W 76/12 |
| 2020/0008044 A1* | 1/2020 | Poornachandran | H04L 67/56 |
| 2020/0015066 A1* | 1/2020 | Zhu | H04W 48/18 |
| 2020/0077329 A1* | 3/2020 | Zhu | H04W 76/10 |
| 2020/0128461 A1* | 4/2020 | Li | H04W 36/0016 |
| 2020/0137828 A1* | 4/2020 | Yang | H04W 76/12 |
| 2020/0221540 A1* | 7/2020 | Sun | H04W 48/16 |
| 2020/0329008 A1* | 10/2020 | Dao | G06F 16/953 |
| 2020/0367114 A1* | 11/2020 | Li | H04L 47/6215 |
| 2020/0404069 A1* | 12/2020 | Li | H04W 8/24 |
| 2021/0099848 A1* | 4/2021 | Ruan | H04W 36/0079 |
| 2021/0314266 A1* | 10/2021 | Li | H04L 47/20 |
| 2021/0409933 A1* | 12/2021 | Jing | H04W 36/00 |
| 2022/0038960 A1* | 2/2022 | Xu | H04W 28/02 |
| 2022/0116828 A1* | 4/2022 | Yu | H04W 72/20 |
| 2022/0225168 A1* | 7/2022 | Kim | H04W 28/10 |
| 2022/0248273 A1* | 8/2022 | Sama | H04W 36/12 |
| 2022/0256436 A1* | 8/2022 | Guo | H04W 40/36 |
| 2022/0294494 A1* | 9/2022 | Kim | H04W 88/18 |
| 2022/0303824 A1* | 9/2022 | Li | H04W 36/26 |
| 2022/0322132 A1* | 10/2022 | Kim | H04W 28/0268 |
| 2022/0329292 A1* | 10/2022 | Kim | H04B 7/0695 |
| 2022/0345934 A1* | 10/2022 | Kim | H04W 72/12 |

OTHER PUBLICATIONS

Written Opinion of the International Searching Authority issued in PCT/JP2019/039405 on Apr. 14, 2020 (4 pages).

3GPP TS 23.501 V16.1.0; "3rd Generation Partnership Project; Technical Specification Group Services and System Aspects; System Architecture for the 5G System; Stage 2 (Release 16)"; Jun. 2019 (368 pages).

3GPP TS 23.502 V16.1.1; "3rd Generation Partnership Project; Technical Specification Group Services and System Aspects; Procedures for the 5G System; Stage 2 (Release 16)"; Jun. 2019 (495 pages).

Extended European Search Report issued in European Application No. 19947583.1, dated May 19, 2023 (10 pages).

Office Action issued in the counterpart Japanese Patent Application No. 2021-550939, mailed on Aug. 22, 2023 (5 pages).

Office Action issued in Chinese Patent Application No. 201980100880.0, mailed on Aug. 31, 2023 (15 pages).

* cited by examiner

ACCESS CONTROL APPARATUS AND USER PLANE APPARATUS

TECHNICAL FIELD

The present invention relates to control when a terminal moves in a communication system.

BACKGROUND ART

In the 3rd Generation Partnership (3rd GPP) project, a wireless communication system called 5G or NR (hereinafter, the wireless communication system is referred to as "5G" or "NR") is being studied in order to achieve further increase in system capacity, further increase in data transmission speed, and further decrease in the delay in the wireless section. In 5G, various wireless technologies are being studied in order to achieve a throughput of 10 Gbps or higher and to meet the requirement of a delay of 1 ms or less in the wireless section.

In 5G, a network architecture that includes 5GC (5G Core Network) corresponding to EPC (Evolved Packet Core), which is the core network in the LTE (Long Term Evolution) network architecture, and NG-RAN (Next Generation-Radio Access Network) corresponding to E-UTRAN (Evolved Universal Terrestrial Radio Access Network), which is the RAN (Radio Access Network) in the LTE network architecture, is introduced (non-patent document 1, for example).

PRIOR ART DOCUMENTS

Non-Patent Documents

[Non-Patent Document 1] 3GPP TS 23. 501 V16. 1. 0 (2019-06)
[Non-Patent Document 2] 3GPP TS 23. 502 V16. 1. 1 (2019-06)

SUMMARY OF INVENTION

Problem to be Solved by the Invention

In recent years, mobile edge computing (MEC), which performs service processing at a position close to terminals, has become popular. A server that runs an application in mobile edge computing is called a MEC server. The MEC server may be referred to as an application server.

However, in the prior art, when a terminal moves from a source MEC server to a target MEC server, there is a problem in that packet loss during move may occur, especially in UL (uplink).

The present invention has been made in view of the above-described points, and is intended to provide a technology that can prevent packet loss of UL when switching from a source application server to a target application server occurs due to movement of a terminal using an application server.

Means for Solving Problems

According to the disclosed technique, there is provided an access control apparatus including:
a reception unit; and
a control unit configured to store, in a buffer, data transmitted from a terminal from when the reception unit receives a first message indicating that an application server is to be switched until when the reception unit receives a second message indicating move completion of an application context. [Effects of the Invention]

According to the disclosed technique, there is provided a technique that can prevent packet loss of UL when switching from a source application server to a target application server occurs due to movement of a terminal using an application server.

MODE FOR CARRYING OUT THE INVENTION

Hereinafter, embodiments of the present invention will be described with reference to the drawings. The embodiments described below are examples, and the embodiments to which the present invention is applied are not limited to the following embodiments.

In operating the wireless communication system according to an embodiment of the present invention, existing techniques may be used, as appropriate. The existing technology is, for example, an existing LTE or existing 5G, but is not limited to an existing LTE or existing 5G.

In the following description, the node name, signal name, etc. currently described in the 5G specification (or the LTE specification) are used. However, the node name, signal name, etc. having the same function may be called by a different name.

(Example of System Configuration)

Figure 1:
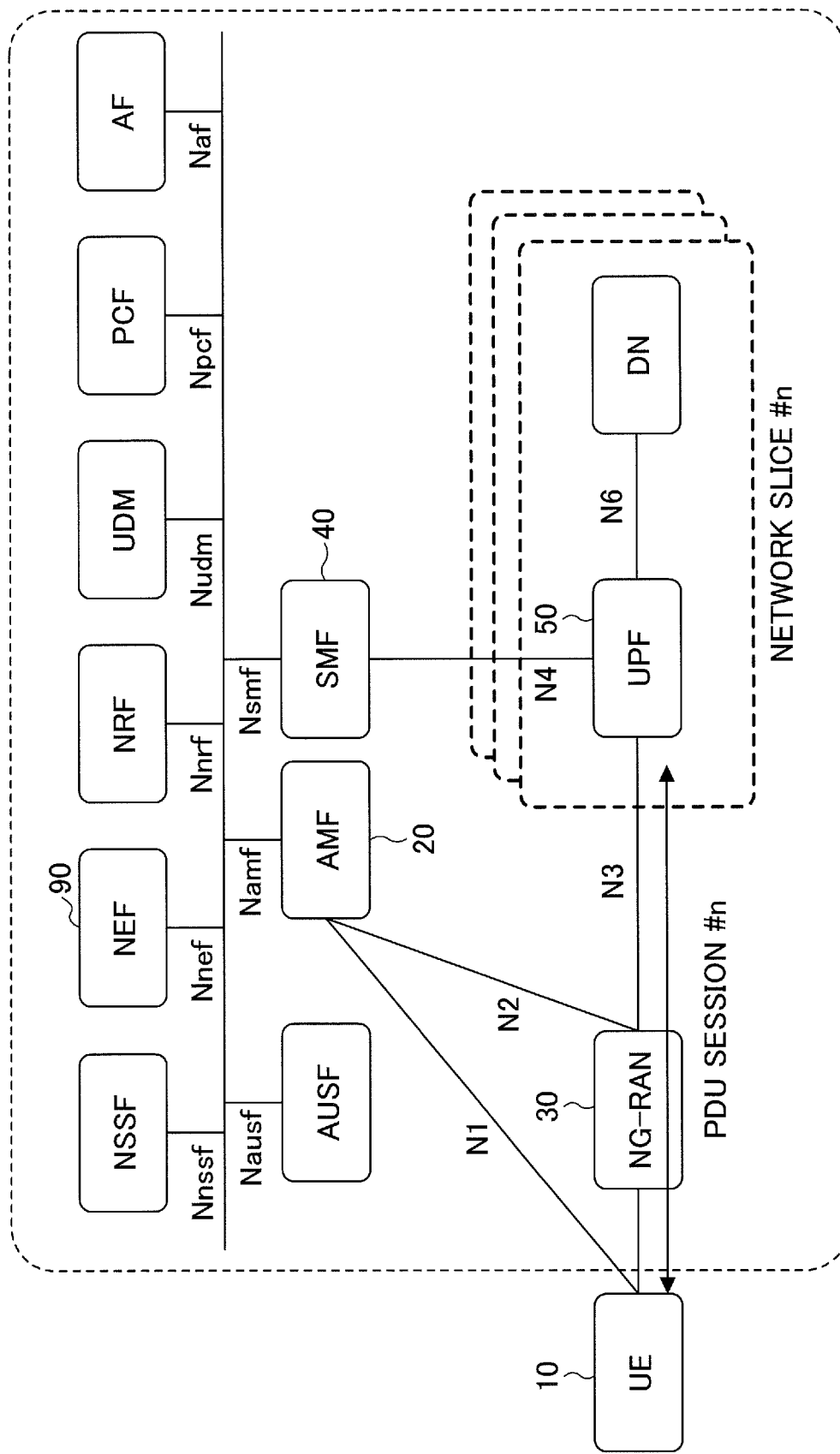
FIG. 1 is a diagram for explaining a communication system according to an embodiment of the present invention.

FIG. 1 is a diagram illustrating a communication system according to an embodiment of the present invention. As shown in FIG. 1, the communication system comprises a UE 10 (which may be referred to as a user terminal 10 or terminal 10), and a plurality of network nodes. Hereinafter, one network node corresponds to each function, but multiple functions may be realized by one network node or multiple network nodes may realize one function. Also, "connection" described below may be a logical connection or a physical connection.

NG-RAN (Radio Access Network) 30 is a network node with wireless access functions, and is connected to the UE 10, the AMF (Access and Mobility Management Function) 20 and the UPF (User plane function) 50. The AMF 20 is a network node having functions such as a RAN interface termination, a NAS (Non-Access Stratum) termination, registration management, connection management, reachability management, and mobility management.

The UPF 50 is a network node having functions such as a PDU (Protocol Data Unit) session point for an external entity interconnecting with a DN (Data Network), packet routing and forwarding, and QoS (Quality of Service) handling on the user plane. The UPF 50 transmits and receives user data. The UPF 50 and the DN constitute network slices. In the wireless communication network according to an embodiment of the present invention, a plurality of network slices are formed.

In the example of FIG. 1, one UPF 50 corresponds to one network slice. However, in the present embodiment, one UPF 50 may operate multiple network slices.

The UPF 50 may also be referred to as a user plane apparatus. Also, the plurality of network slices operated by the UPF 50 are slices involved in communication between the NG-RAN 30 and the UPF 50 (e.g., the PSA (PDU Session Anchor) UPF).

The UPF 50 is physically, for example, one or more computers (servers, etc.). A plurality of resources that can logically integrate and divide hardware resources (CPU, memory, hard disk, network interface, etc.) of the computer can be regarded as a resource pool, and each resource can be used as a network slice in the resource pool. When the UPF 50 operates a network slice, for example, it manages the correspondence between a network slice and a resource, starts and stops the resource, and monitors the operational status of the resource.

The AMF 20 is connected to the UE 10, the NG-RAN 30, the SMF (Session Management function) 40, a NSSF (Network Slice Selection Function), a NEF (Network Exposure Function), a NRF (Network Repository Function), an AUSF (Authentication Server Function), a PCF (Policy Control Function), and an AF (Application Function). The AMF, the SMF, the NSSF, the NEF 90, the NRF, the AUSF, the PCF 70, and the AF 60 are interconnected network nodes via their respective service-based interfaces, Namf, Nsmf, Nnssf, Nnef, Nnrf, Nausf, Npcf, and Naf.

The SMF 40 is a network node having functions such as session management, Internet Protocol (IP) address assignment and management of UE, DHCP (DHCP) function, Address Resolution Protocol (ARP) proxy, and roaming function, and the like. The SMF 40 may also be referred to as a session management apparatus.

The NEF 90 is a network node that has a function to notify other NFs (Network Functions) of capabilities and events. The NSSF is a network node that has functions such as selecting a network slice to which a UE 10 connects, determining an allowed NSSAI (Network Slice Selection Assistance Information), determining a NSSAI to be configured, and determining an AMF set to which the UE connects. The PCF is a network node having a function for controlling a policy of the network. The AF is a network node that has a function of controlling an application server.

Figure 2:
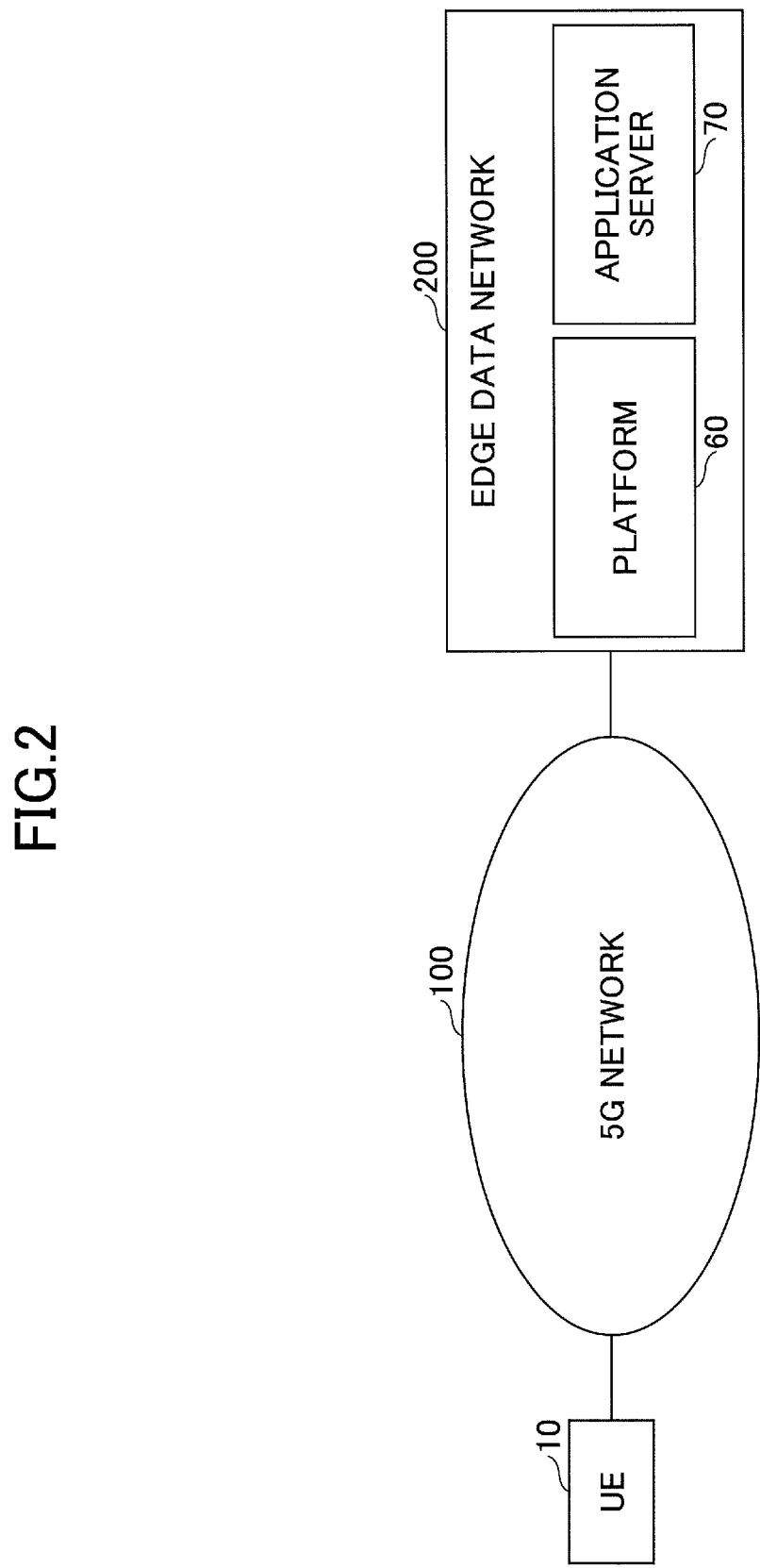
FIG. 2 is a diagram showing an example configuration when a platform and an application server are present.

In this embodiment, an application server 70 that is equivalent to a MEC server in mobile edge computing is used. A configuration example is shown in FIG. 2. As shown in FIG. 2, the UE 10 and an edge data network 200 are connected to a 5G network 100.

The edge data network 200 includes a platform 60 and an application server 70. The names "edge data network" and "platform" are examples and other names may be used.

The platform 60 is a device for controlling access of the application server 70 to the 5G network 100, which may be referred to as an access control apparatus. The platform 60 may also be referred to as an Edge Enabler Server. The application server 70 is a server (also referred to as an instance) that operates an application that provides services to the UE 10.

Wireless connection or wired connection is made between the platform 60 and the application server 70. Alternatively, the platform 60 and the application server 70 may be included in one apparatus.

The platform 60 may have only a control function (C-plane function) or may have both a control function (C-plane function) and a data communication function (U-plane function).

In this embodiment, it is assumed that the platform 60 and the application server 70 are provided for each location, and when the UE 10 moves from one location to another, the platform 60 and the application server 70 utilized by the UE 10 are switched to a platform 60 and an application server 70 of a moved location. Hereafter, the entity of the moving source is called "source" and the entity of the moving destination is called "target". "S" appearing as "S-UPF" or the like hereinafter means the source, and "T" appearing as "T-UPF" or the like means the target. In addition, in the reference symbols attached to an apparatus, etc., S is attached to the source, such as "50S." T is added to the target, such as "50T".

As the UE 10 moves, switch from the source application server 70S to the target application server 70T occurs. The UPF 50 is also switched from S-UPF 50S to T-UPF 50T.

At this time, a context (application context) of an application used by the UE 10 is moved from the application server 70S to the application server 70T.

In the prior art, however, packets (which may be referred to as data) being sent from the UE 10 may arrive at the application server 70T before the transfer of the application context from the source application server 70S to the target application server 70T is completed. In this case, the application server 70T with no application context for the UE 10 cannot use received packets properly, so the packs are lost.

Hereinafter, Example 1 and Example 2 will be described as a technology for solving the above-described problems. In the Examples 1 and 2 below, operation will be described in detail especially from the viewpoint of preventing packet loss. An operation (existing technologies) to minimize service interruptions may also be performed.

Example 1

Overview of Example 1

Figure 3:
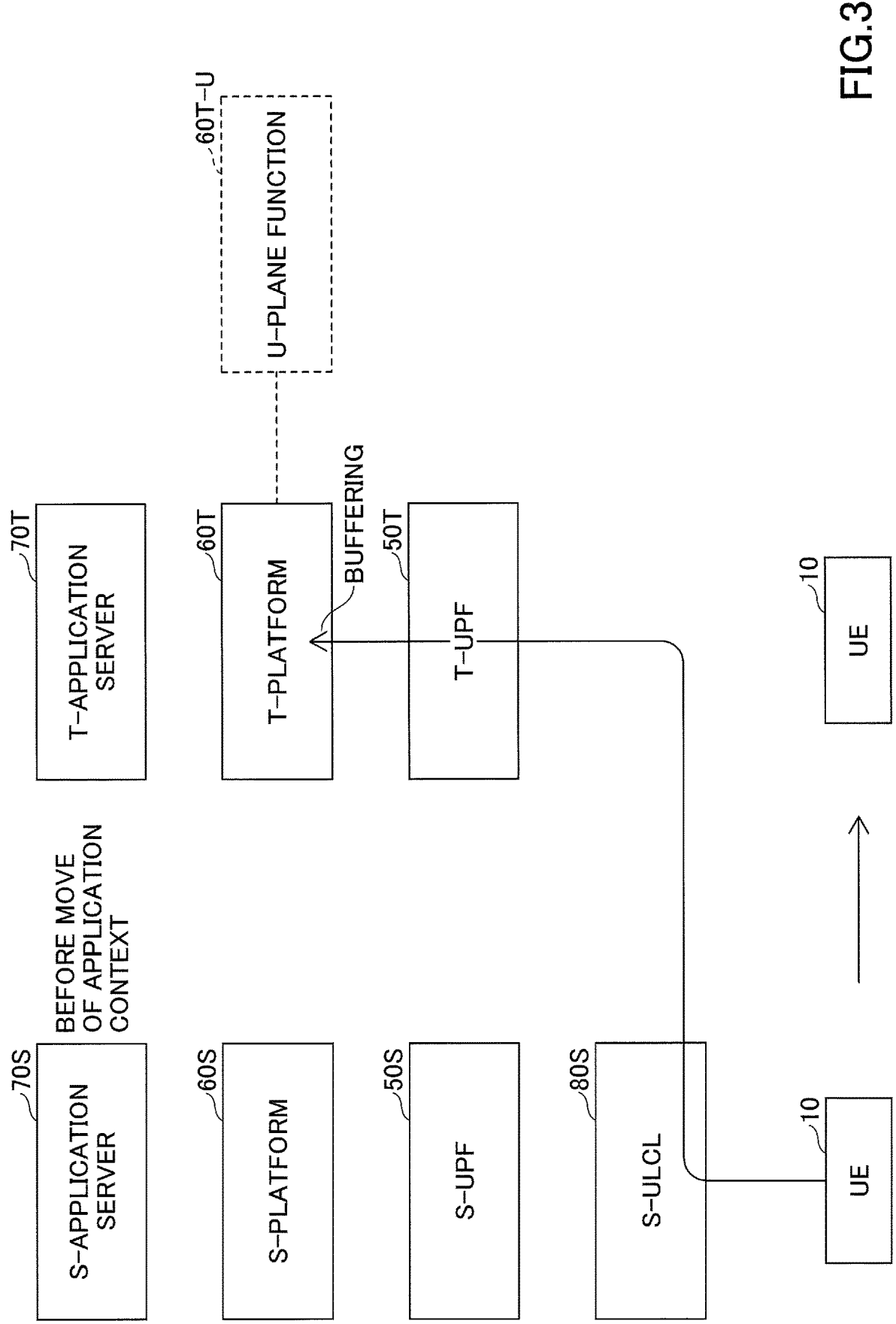
FIG. 3 is a diagram for explaining an outline of Example 1.

FIG. 3 is a diagram for explaining an outline of the Example 1. The ULCL (Uplink Classifier) described as S-ULCL 80S in FIG. 3 is a function (node device) that branches uplink-direction packets sent from the UE 10 according to filtering rules. The ULCL is one of UPFs. Insertion of ULCL functions into a PDU session and rule setting for detection and forwarding of traffic are performed by the SMF 40.

While the UE 10 remains at the source location, a packet sent from the UE 10 is transferred to the S-application server 70S via the S-UPF 50S.

When UE 10 begins to move from the source location to the target location, at some point, packets sent from the UE 10 are forwarded by the S-ULCL 80S to the T-UPF 50T and forwarded from the T-UPF 50T to the T-platform 60T. At this point, the application context has not been transferred from source to target. If a packet is forwarded from the T-platform 60T to the T-application server 70T at this point, the packet will be lost.

Therefore, in Example 1, as shown in FIG. 3, the T-platform 60T buffers packets of UL received before transfer of the application context. The T-platform 60T transfers packets to the T-application server 70T after the application context has been moved. Note that "to buffer" may be changed to "to store in a buffer".

The above description is an example where the T-platform 60T includes a U-plane function. As shown in FIG. 3, a U-plane function 60T-U, without a U-plane function, corresponding to the T-platform 60T may be provided in the outside of the T-platform 60T. In this case, the U-plane function 60T-U may be called a buffer unit 60T-U.

In this case, data is transferred from the T-UPF 50T to the buffer unit 60T-U. When it is determined that the application server is switched, the T-platform 60T instructs the buffer unit 60T-U to store the data transmitted from the UE 10, and instructs the buffer unit 60T-U to terminate the storage of the data when the transfer of the application context is completed.

Detailed Sequence of Example 1

Figure 4:
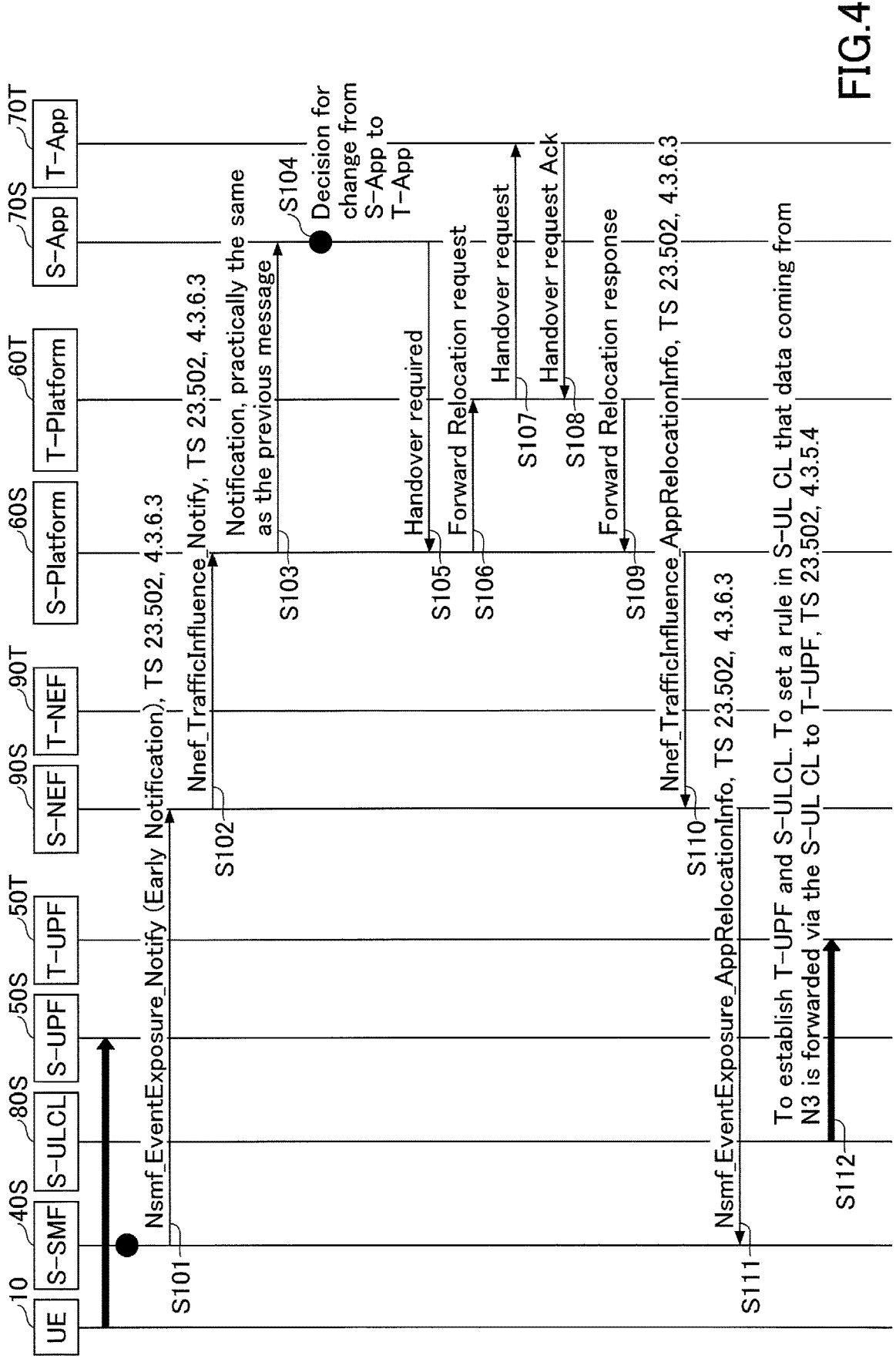
FIG. 4 is a diagram illustrating an example of a detailed sequence of Example 1.
Figure 5:
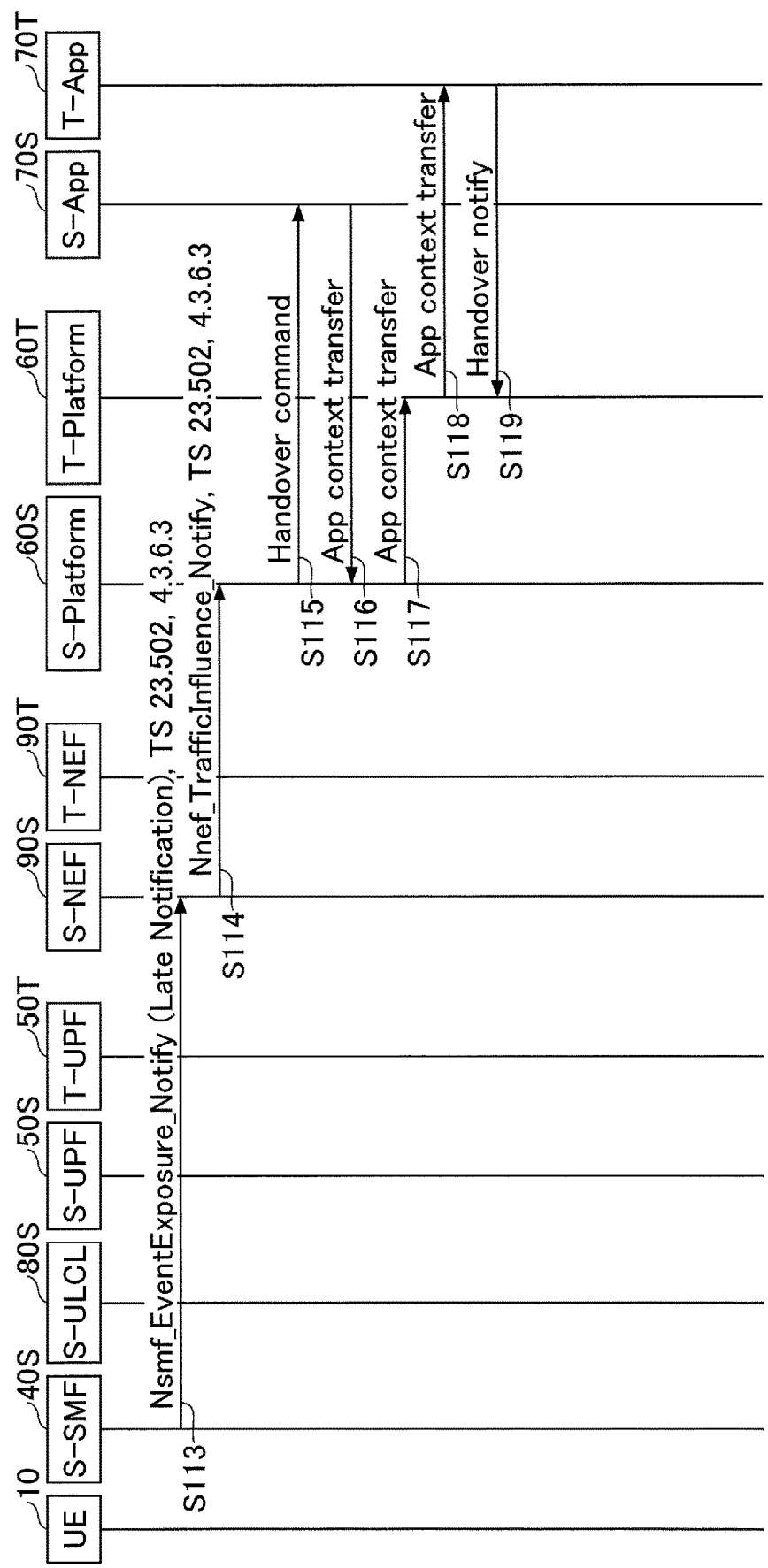
FIG. 5 is a diagram illustrating an example of a detailed sequence of Example 1.

Next, a detailed sequence of Example 1 will be described with reference to FIGS. 4 and 5. In FIGS. 4 and 5 (and FIGS. 7 and 8 of Example 2), messages described in Non-Patent Document 2 (TS23.502) etc. are used. However, it is an example that the messages described in Non-Patent Document 2 (TS23.502) etc. are used, and another message may be used. The "App" is an application server.

Before the UE 10 moves, the data transmitted from the UE 10 is transferred to the S-UPF 50S. After the UE 10 starts to move, the S-SMF 40S determines that UPF used by the UE 10 needs to be changed and sends to the S-NEF 90S a message in S101, Nsmf_EventExposure_Notify (Early Notification) indicating that it is necessary to change a transfer route of data transmitted from the UE 10 toward the S-App 70S. Messages sent in S102 and S103 below are also messages indicating that it is necessary to change the transfer route of data sent from the UE 10 to the S-App 70S.

In S102, the S-NEF 90S transmits Nnef_TrafficInfluence_Notify to the S-Platform 60S, and in S103, the S-Platform 60S transmits a message similar to Nnef_TrafficInfluence_Notify to the S-App 70S.

Upon receiving the message of S103, the S-App 70S, recognizing that the UE 10 using the application moves to the target location, in S104, decides to change the application server used by the UE 10 from the S-App 70S to the T-App 70T.

In S105, the S-App 70S sends a Handover required, to the S-Platform 60S, which is a message indicating that a handover (switching from S-App 70S to T-App 70T) is required.

If the S-Platform 60S determines that handover is necessary by receiving the message of S102, the steps of S103 to S105 may be skipped.

In S106, the S-Platform 60S sends a Forward Relocation request to the T-Platform 60T which is a message indicating that a handover is required.

In S107, the T-Platform 60T transmits a Handover request requesting handover to the T-App 70T. In S108, the T-App 70T transmits a Handover request Ack indicating that the handover has been acknowledged to the T-Platform 60T.

The T-Platform 60T that has received the Handover request Ack recognizes that data transmitted from the UE 10 needs to be buffered. When the U-plane function is provided externally, the U-plane function is instructed to buffer the data transmitted from the UE 10. Handover request Ack is an example of a message indicating that the application server used by the terminal is switched from the application server of the source to the application server of the target.

In S109, the T-Platform 60T transmits Forward Relocation response, which is a response to S106, to the S-Platform 60S.

In S110, the S-Platform 60S sends to the S-NEF 90S Nnef_TrafficInfluence_AppRelocationInfo, which is a message indicating that S102 is acknowledged. In S111, the S-NEF 90S transmits Nsmf_EventExposure_AppRelocationInfo, which is a message indicating that S101 is acknowledged, to the S-SMF 40S.

The S-SMF 40S that receives the message of S111 constructs the T-UPF 50T and the S-ULCL 80S and sets a rule for the S-ULCL 80S. This rule is for the S-ULCL 80S to transfer data from the UE 10 arriving from the NG-RAN 30 to the T-UPF 50T. By this setting, in S112, the data transmitted from the UE 10 is transferred to the T-UPF 50T.

In S113 of FIG. 5, the S-SMF 40S transmits Nsmf_EventExposure_Notify (Late Notification) to the S-NEF 90S, which is a message indicating that a transfer route of data transmitted from the UE 10 has been changed.

In S114, the S-NEF 90S transmits Nnef_TrafficInfluence_Notify to the S-Platform 60S, which is a message indicating that the transfer route of data transmitted from the UE 10 has been changed.

In S115, the S-Platform 60S transmits Handover command to the S-App 70S. In S116, the S-App 70S transmits the application context to the S-Platform 60S, and in S117, the S-Platform 60S transmits the application context to the T-Platform 60T. In S118, the T-Platform 60T transmits the application context to the T-App 70T.

In S119, the T-App 70T sends Handover notify to the T-Platform 60T indicating that transfer of the application context has been completed.

From S112 to before S119, data transmitted from the UE 10 is transferred to the T-Platform 60T, and the T-Platform 60T buffers the received data (or the corresponding U-plane function buffers the data). When the T-Platform 60T recognizes that the transfer of application context to the T-App 70T has been completed by receiving Handover notify in S119, the T-Platform 60T releases the buffer and transfers the data stored in the buffer and data received thereafter to the T-App 70T.

According to the Example 1, due to move of a terminal using an application server, when switching from an application server of the source to an application server of the target occurs, packet loss of UL can be prevented.

Example 2

Figure 6:
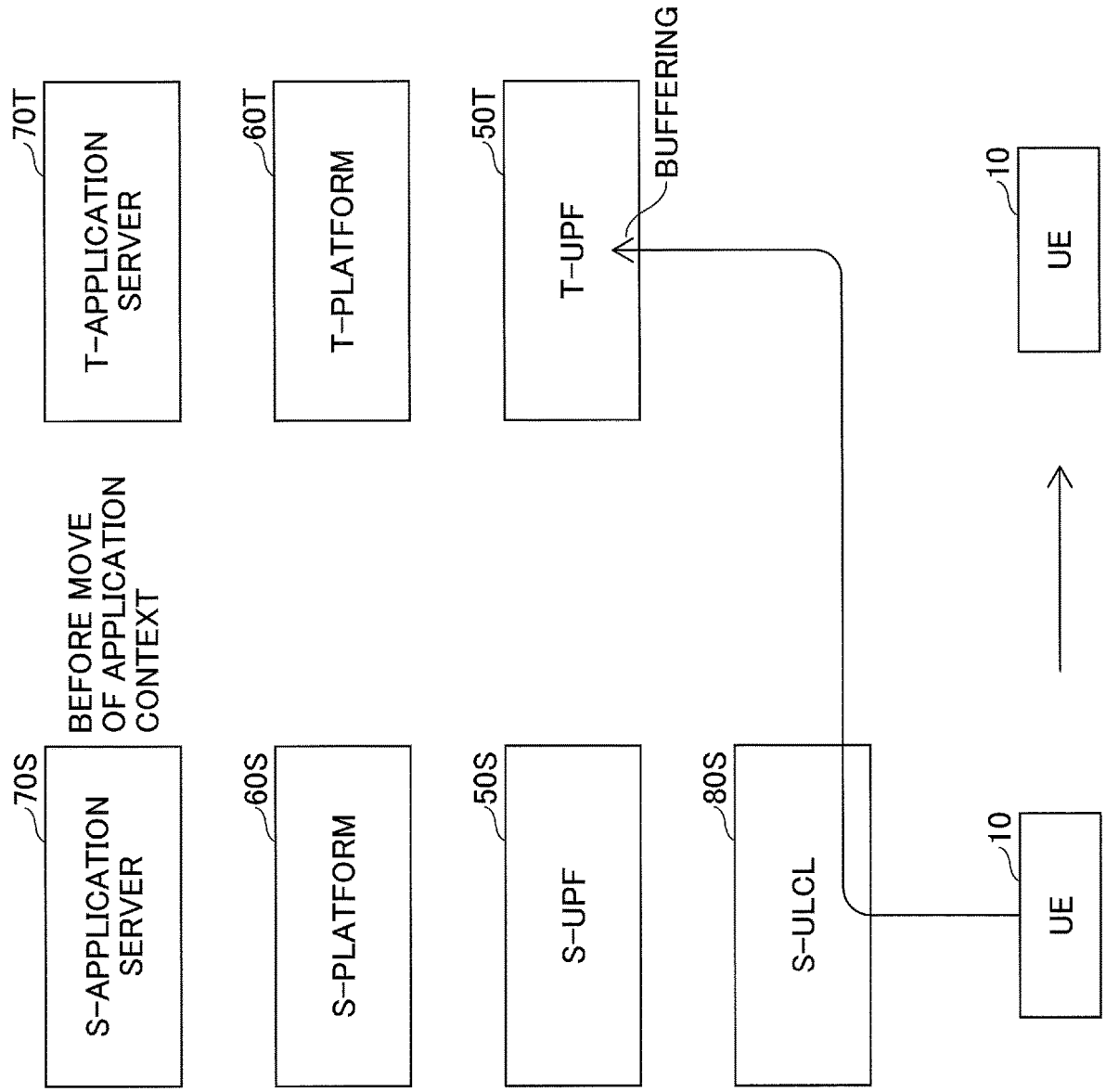
FIG. 6 is a diagram for explaining an outline of Example 2.

Next, Example 2 will be described. FIG. 6 is a diagram for explaining an outline of Example 2. While the UE 10 remains at the source location, packets sent from the UE 10 are forwarded to the S-application server 70S via the S-UPF 50S.

When the UE 10 begins to move from the source location to the target location, at some point, packets sent from the UE 10 are forwarded to the T-UPF 50T by the S-ULCL 80S. At this point, the application context has not been transferred from source to target. At this point, if a packet is forwarded from the T-UPF 50T to the T-application server 70T, packet loss occurs.

Therefore, in Example 2, as shown in FIG. 6, the T-UPF 50T buffers packets of UL received before transfer of the application context. The T-UPF 50T transfers packets to the T-application server 70T after the application context has been moved.

Detailed Sequence of Example 2

Figure 7:
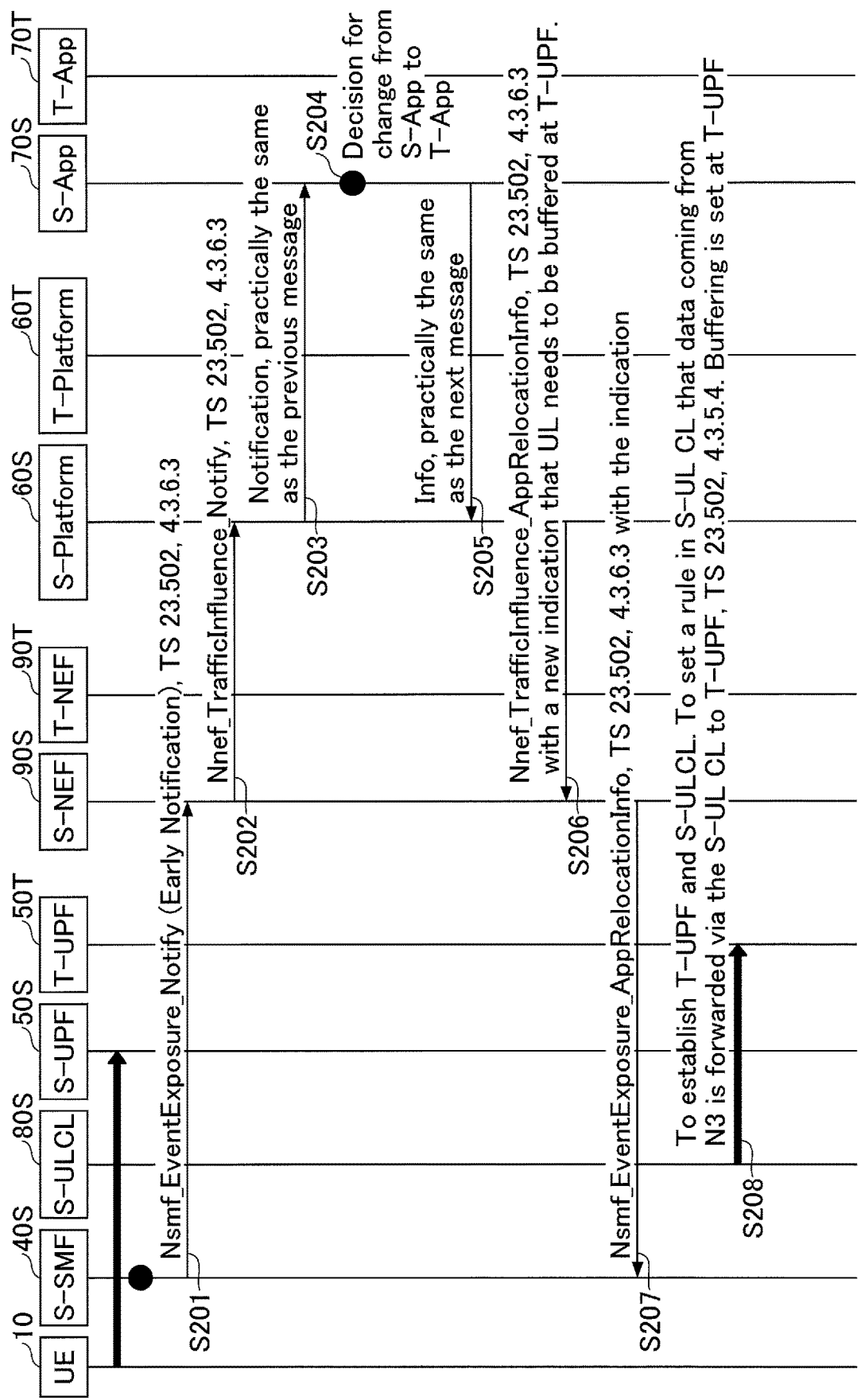
FIG. 7 is a diagram showing an example of a detailed sequence of Example 2.

Next, a detailed sequence of Example 2 will be described with reference to FIGS. 7 and 8. Prior to move of the UE 10, data transmitted from the UE 10 are transferred to the S-UPF 50S. After the UE 10 starts to move, the S-SMF 40S determines that UPF used by the UE 10 needs to be changed and, in S201, sends to the S-NEF 90S a message, Nsmf_EventExposure_Notify (Early Notification), indicating that it is necessary to change the transfer route of data transmitted from the UE 10 to the S-App 70S. The messages sent in S202 and S203 are also messages indicating that it is necessary to change the transmission route of data sent from the UE 10 to the S-App 70S.

In S202, the S-NEF 90S transmits Nnef_TrafficInfluence_Notify to the S-Platform 60S, and in S203, the S-Platform 60S transmits a message similar to Nnef_TrafficInfluence_Notify to the S-App 70S.

Upon receiving the message of S203, the S-App 70S, recognizing that the UE 10 using the application moves to the target location, decides to change the application server used by the UE 10 from the S-App 70S to the T-App 70T in S204.

In S205, the S-App 70S sends a message to the S-Platform 60S indicating that S203 is acknowledged.

If the S-Platform 60S determines that handover is required by receiving a message of S202, the steps from S203 to S205 may be skipped.

In S206, the S-Platform 60S sends to the S-NEF 90S Nnef_TrafficInfluence_AppRelocationInfo, which is a message indicating that S202 is acknowledged. An indication that UL data sent by the UE 10 needs to be buffered by the T-UPF 50T is added to this message.

In S207, the S-NEF 90S transmits Nsmf_EventExposure_AppRelocationInfo, which is a message indicating that S201 is acknowledged, to the S-SMF 40S. This message is accompanied by the above indication.

Upon receiving the message of S207, the S-SMF 40S constructs the T-UPF 50T, and performs setting for the T-UPF 50T for buffering based on the above indication attached to the message received in S207. That is, the S-SMF 40S sends an instruction to the T-UPF 50T indicating that the data transmitted from the UE 10 is to be stored in a buffer. Since this instruction is based on determination of S204 by the S-App 70, it is also an instruction sent from the S-App 70. Subsequently, the S-SMF 40S constructs the S-ULCL 80S and sets a rule for the S-ULCL 80S. This rule is for the S-ULCL 80S to transfer data from the UE 10 arriving from the NG-RAN 30 to the T-UPF 50T.

By the above setting, in S208, the data transmitted from the UE 10 is transferred to the T-UPF 50T. the T-UPF 50T buffers the received data.

Figure 8:
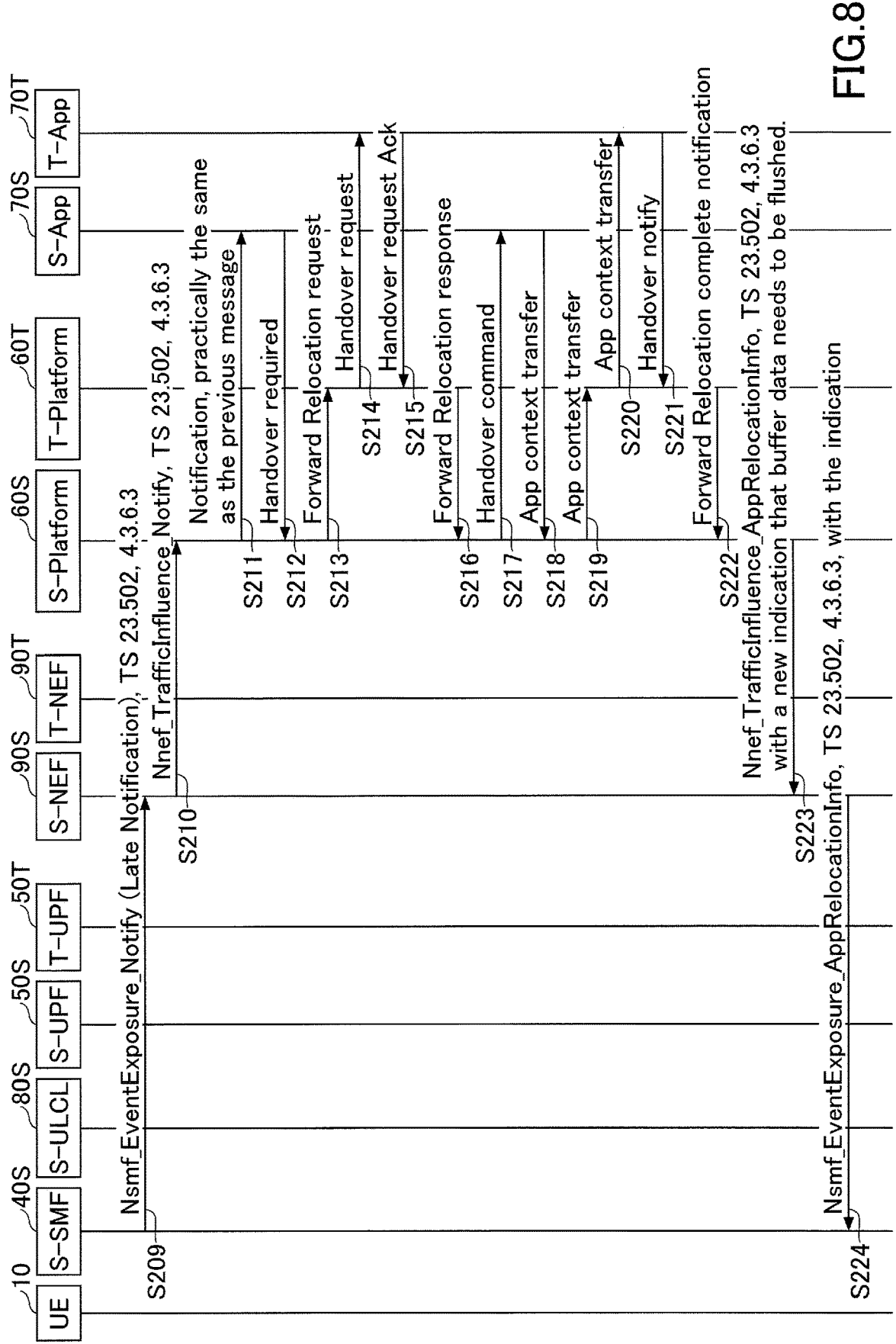
FIG. 8 is a diagram showing an example of a detailed sequence of Example 2.

In S209 of FIG. 8, the S-SMF 40S transmits the Nsmf_EventExposure_Notify (Late Notification) to the S-NEF 90S as a message indicating that a transfer route of data transmitted from the UE 10 has been changed.

In S210, the S-NEF 90S transmits Nnef_TrafficInfluence_Notify to the S-Platform 60S, which is a message indicating that the transfer route of data transmitted from the UE 10 has been changed.

In S211, the S-Platform 60S transmits a message similar to Nnef_TrafficInfluence_Notify to the S-App 70S.

The S-App 70S that received the message of S211 transmits a Handover required to the S-Platform 60S, which is a message indicating that handover (switching from S-App 70S to T-App 70T) is necessary in S212.

If the S-Platform 60S determines that handover is required by receiving the message of S210, the steps of S211 to S212 may be skipped.

In S213, the S-Platform 60S sends a Forward Relocation request to the T-Platform 60T indicating that handover is necessary.

In S214, the T-Platform 60T transmits a Handover request requesting handover to the T-App 70T. In S215, the T-App 70T transmits a Handover request Ack indicating that the handover has been acknowledged to the T-Platform 60T.

In S216, the T-Platform 60T transmits a Forward Relocation response, which is a response to S213, to the S-Platform 60S.

In S217, the S-Platform 60S transmits Handover command to the S-App 70S. In S218, the S-App 70S transmits the application context to the S-Platform 60S, and in S219, the S-Platform 60S transmits the application context to the T-Platform 60T. In S220, the T-Platform 60T transmits the application context to the T-App 70T.

In S221, the T-App 70T sends a Handover notify to the T-Platform 60T indicating that the application context transfer has been completed.

In S222, the T-Platform 60T sends Forward Relocation complete notification to the S-Platform 60S indicating that application context transfer has been completed.

In S223, the S-Platform 60S transmits to the S-NEF 90S Nnef_TrafficInfluence_AppRelocationInfo with an instruction to request release of buffered data, and in S224, the S-NEF 90S transmits to the S-SMF 40S Nsmf_EventExposure_AppRelocationInfo with the above-mentioned instruction. The S-SMF 40S that receives this instruction instructs the T-UPF 50T to release the buffer. That is, the S-SMF 40S sends an instruction to the T-UPF 50T indicating that storing data transmitted from the UE 10 in a buffer is terminated. Since this instruction is based on the Handover notify of S221 by the T-App 70T, it is also an instruction sent from the T-App 70T.

From S208 to S224, data transmitted from the UE 10 is transferred to the T-UPF 50T, and the T-UPF 50T buffers received data. When the T-UPF 50T receives the instruction to release the buffer from the S-SMF 40S, it releases the buffer and transfers the data stored in the buffer and data to be received thereafter to the T-App 70T.

According to the Example 2, due to move of a terminal using an application server, when switching from an application server of the source to an application server of the target occurs, packet loss of UL can be prevented.

(Equipment Configuration)

Next, a functional configuration example of an access control apparatus 60 corresponding to the T-Platform 60T and a user plane apparatus 50 corresponding to the T-UPF 50T that perform the processing and operations described above will be described.

<Access Control Apparatus 60>

Figure 9:
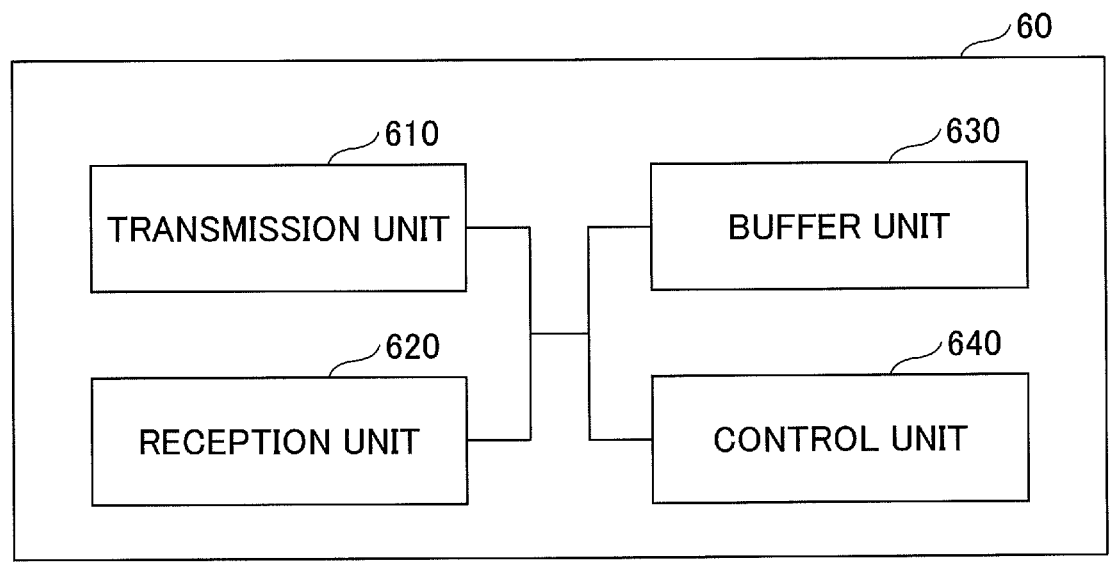
FIG. 9 is a diagram showing an example of a functional configuration of an access control apparatus 60 according to an embodiment of the present invention.

FIG. 9 is a diagram illustrating an example of a functional configuration of an access control apparatus 60. FIG. 9 shows an example including U-plane functions. As shown in FIG. 9, the access control apparatus 60 includes a transmission unit 610, a reception unit 620, a buffer unit 630, and a control unit 640. The functional configuration shown in FIG. 9 is only one example. As long as the operation according to the embodiments of the present invention can be performed, the functional category and the name of the functional unit may be any one.

The transmission unit 610 includes a function for generating a signal to be transmitted and transmitting the signal to a network. The reception unit 620 receives various signals. The transmission unit 610 and the reception unit 620 may be referred to as a transmitter and a receiver, respectively.

The buffer unit 630 has a buffer (storage part) and stores the received data in a buffer under control from the control unit 640, for example. Further, the data stored in the buffer is read out by control from the control unit 640. The control unit 640 controls the access control apparatus 60. The buffer unit 630 may be included in the control unit 640.

When the access control apparatus 60 does not have U-plane functions, the buffer unit 630 is provided outside the access control apparatus 60. When it is determined that the application server is switched, the control unit 640 instructs the buffer unit to store the data transmitted from the UE 10. When transfer of the application context is completed, the control unit 640 instructs the buffer unit to terminate storage of data.

<User Plane Apparatus 50>

Figure 10:
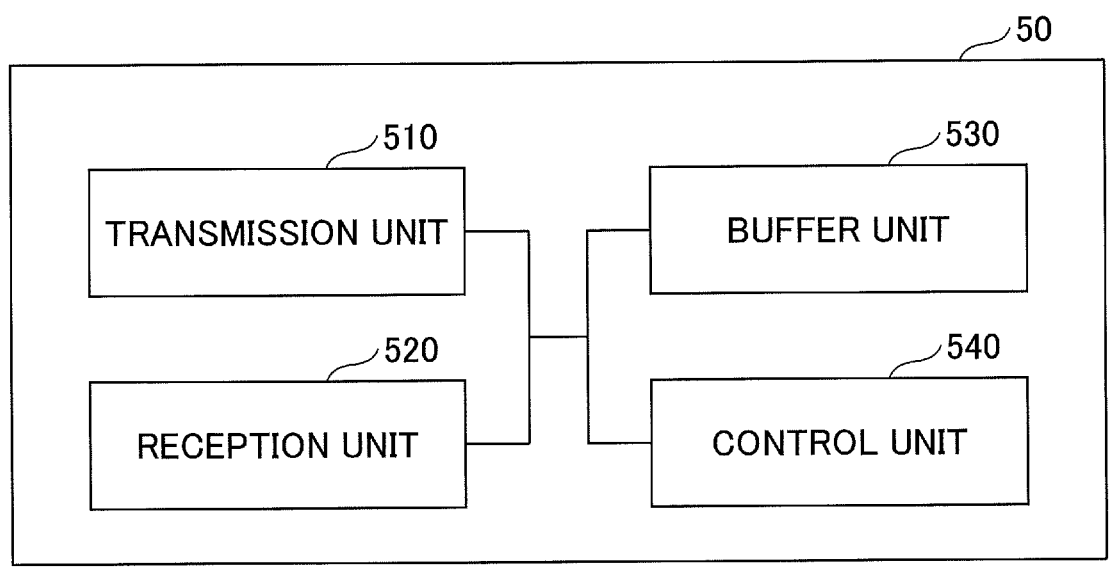
FIG. 10 is a diagram showing an example of a functional configuration of a UPF 50 according to an embodiment of the present invention.

FIG. 10 is a diagram illustrating an example of a functional configuration of a user plane apparatus 50. As shown in FIG. 10, the user plane apparatus 50 includes a transmission unit 510, a reception unit 520, a buffer unit 530, and a control unit 540. The functional configuration shown in FIG. 10 is only one example. As long as the operation according to the embodiments of the present invention can be performed, the functional category and the name of the functional unit may be any one.

The transmission unit 510 includes a function for generating a signal to be transmitted and transmitting the signal to a network. The reception unit 520 receives various signals.

The buffer unit 530 includes a buffer and, under the control of the control section 540, stores data received from the UE 10 in the buffer, and reads out data stored in the buffer. The control unit 540 controls the user plane apparatus 50. The buffer unit 530 may be included in the control unit 540.

(Hardware Configuration)

Block diagrams (FIGS. 9-10) used for the description of the above embodiments show blocks of functional units. These functional blocks (components) are implemented by any combination of hardware and/or software. In addition, the implementation method of each function block is not particularly limited. That is, each functional block may be implemented using a single device that is physically or logically combined, or two or more devices that are physically or logically separated may be directly or indirectly connected (e.g., using wired, wireless, etc.) and implemented using these multiple devices. The functional block may be implemented by combining software with the device or devices.

Functions include, but are not limited to, judgment, determination, determination, calculation, calculation, processing, derivation, research, search, verification, reception, transmission, output, access, resolution, selection, selection, establishment, comparison, assumption, expectation, and deeming; broadcasting, notifying, communicating, forwarding, configuring, reconfiguring, allocating, mapping, and assigning. For example, a functional block (component) that functions to transmit is called a transmitting unit or a transmitter. In either case, as described above, the realization method is not particularly limited.

Figure 11:
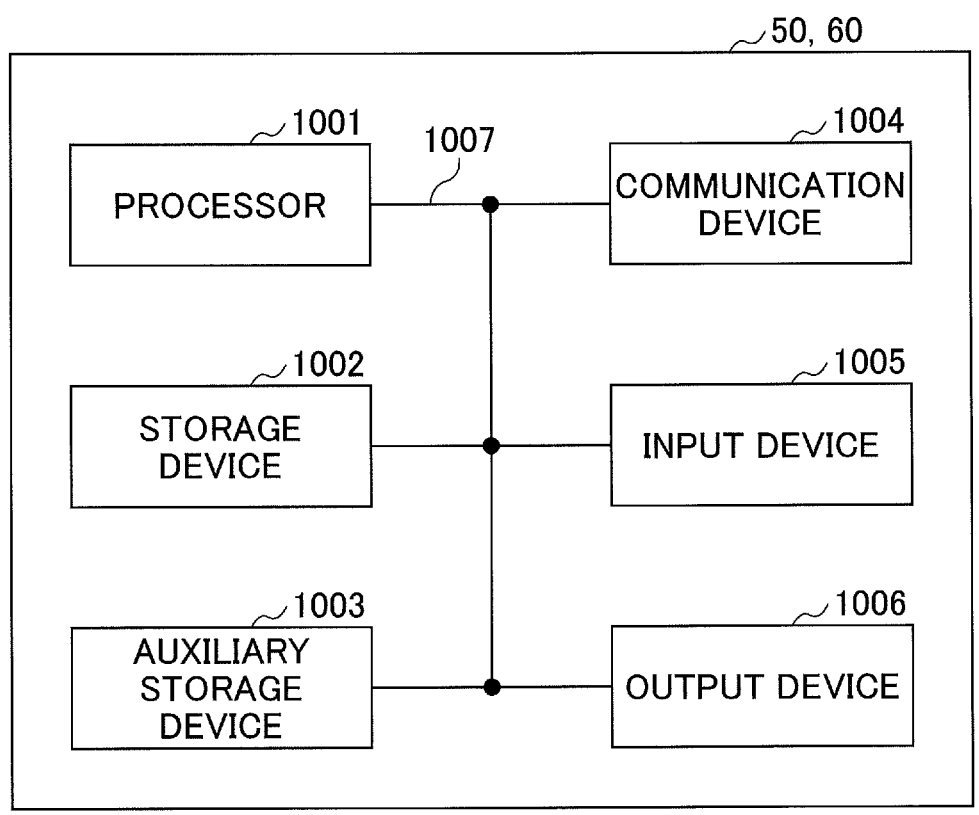
FIG. 11 is a diagram illustrating an example of a hardware configuration of the access control apparatus 60 or the UPF 50 according to an embodiment of the present invention.

For example, the access control apparatus 60 and the user plane apparatus 50 according to an embodiment of the present disclosure may function as a computer for processing the present disclosure. Also, the session management apparatus 40 and the like may function as a computer performing the disclosed processing. FIG. 11 is a diagram illustrating an example of a hardware configuration of the access control apparatus 60 and the user plane apparatus 50 according to an embodiment of the present disclosure. The access control apparatus 60 and the user plane apparatus 50 described above may be physically configured as a computer device including a processor 1001, a storage device 1002, an auxiliary storage device 1003, a communication device 1004, an input device 1005, an output device 1006, a bus 1007, and the like. The access control apparatus 60 and the user plane apparatus 50 may be a virtual machine respectively.

In the following description, the term "apparatus" can be read as circuits, devices, units, etc. The hardware configuration of the session management apparatus 40, and the user plane apparatus 50 and the like may be configured to include one or more of the devices shown in the figure or may be configured without some of the devices.

The functions of the access control apparatus 60 and the user plane apparatus 50 are realized by performing an operation by the processor 1001 by reading predetermined software (programs) on hardware such as the processor 1001, the storage device 1002, or the like, and controlling communication by the communication device 1004 or reading and/or writing data in the storage device 1002 and the auxiliary storage device 1003.

Processor 1001 operates, for example, an operating system to control the entire computer. The processor 1001 may be comprised of a central processing unit (CPU) including an interface with peripheral devices, a controller, an arithmetic unit, a register, and the like. For example, the above-described control unit 440, control unit 540, and the like may be implemented by the processor 1001.

The processor 1001 reads out a program (program code), software module, data, or the like from at least one of the auxiliary storage device 1003 and the communication device 1004 to the storage device 1002 and performs various processing in accordance with the above. As a program, a program that causes a computer to execute at least a part of the operation described in the above-described embodiment is used. For example, the control unit 640 of the access control apparatus 60 may be realized by a control program stored in the storage device 1002 and operating by the processor 1001. For example, the control unit 540 of the user plane apparatus 50 may be realized by a control program stored in the storage device 1002 and operating by the processor 1001. Although the foregoing processes have been described and executed by one processor 1001, they may be executed simultaneously or sequentially by two or more processors 1001. Processor 1001 may be implemented by one or more chips. The program may be transmitted from the network via a telecommunication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The auxiliary storage device 1003 may be referred to as an auxiliary storage device. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The access control apparatus 60 and the user plane apparatus 50 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

Summary of Embodiments

According to the present embodiment, at least the access control apparatus and the user plane apparatus shown in the following items 1 to 6 are provided.

(Item 1)
An access control apparatus comprising:
a reception unit; and
a control unit configured to store, in a buffer, data transmitted from a terminal from when the reception unit receives a first message indicating that an application server is to be switched until when the reception unit receives a second message indicating move completion of an application context.

(Item 2)
An access control apparatus comprising:
a reception unit;
a control unit configured
when the reception unit receives a first message indicating that an application server is to be switched, to instruct a buffer unit to store data transmitted from a terminal, and
when the reception unit receives a second message indicating move completion of an application context, to instruct the buffer unit to end storing of data transmitted from the terminal.

(Item 3)
The access control apparatus as described in item 1 or 2, wherein the first message is a message indicating that an application server used by the terminal is to be switched from a source application server to a target application server, and
the second message is a message indicating that an application context has moved from the source application server to the target application server.

(Item 4)
A user plane apparatus comprising:
a reception unit; and
a control unit configured to store data transmitted from a terminal in a buffer from when the reception unit receives a first instruction that indicates storing the data transmitted from the terminal in a buffer until when the reception unit receives a second instruction that indicates end of storing the data transmitted from the terminal in the buffer.

(Item 5)
The user plane apparatus as described in item 4, wherein the first instruction is an instruction transmitted from a source application server when it is determined that an application server is to be switched, and
the second instruction is an instruction transmitted from a target application server after completion of move of an application context.

(Item 6)
The user plane apparatus as described in item 4 or 5, wherein the user plane apparatus is a target user plane apparatus when the user plane apparatus is to be switched due to move of the terminal.

According to any of the configurations described in items 1, 2, 3, 4, 5, and 6, there is provided a technique that can prevent packet loss of UL when switching from a source application server to a target application server occurs due to movement of a terminal using an application server.

Supplements to Embodiment

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the access control apparatus 60 and the user plane apparatus 50 have been described with the use of the functional block diagrams, but these apparatuses may be implemented by hardware, software, or a combination thereof. Each of software functioning with a processor of the access control apparatus 60 according to the embodiment of the present invention and software functioning with a processor of the user plane apparatus 50 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the access control apparatus 60 or the user plane apparatus 50 described in the present disclosure may in some cases be performed by another node (upper node).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUSCH, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal.

Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user terminal 20 to assign, in TTI units, radio resources (such as frequency bandwidths, transmission power, and the like that can be used by each user terminal 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may be referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

Although the present disclosure has been described above, it will be understood by those skilled in the art that the present disclosure is not limited to the embodiment described in the present disclosure.

Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

DESCRIPTION OF SYMBOLS

50 User plane apparatus
510 Transmission unit
520 Reception unit
530 Buffer unit
540 Control unit
60 Access control apparatus
610 Transmission unit
620 Reception unit
630 Buffer unit
640 Control unit
1001 Processor
1002 Storage memory
1003 Auxiliary storage device
1004 Communication device 1005 Input device
1006 Output device

The invention claimed is:

1. A user plane apparatus comprising:
a receiver configured to receive, from a session management apparatus, a first indication indicating to store data transmitted from a terminal in a buffer and a second indication indicating to end storing data transmitted from the terminal in the buffer; and
a processor configured to store data transmitted from the terminal in the buffer from when the receiver receives the first indication until the receiver receives the second indication,
wherein the first indication is an indication transmitted from the session management apparatus when it is determined that switching from a source user plane apparatus to a target user plane apparatus is performed, and
wherein the second indication is an indication transmitted from the session management apparatus after completion of move of a context.

2. The user plane apparatus as claimed in claim 1, wherein, when switching from a source user plane apparatus to a target user plane apparatus is performed, the user plane apparatus is the target user plane apparatus.

3. A communication system, comprising:
a user plane apparatus comprising:
  a receiver configured to receive, from a session management apparatus, a first indication indicating to store data transmitted from a terminal in a buffer and a second indication indicating to end storing data transmitted from the terminal in the buffer; and
  a processor configured to store data transmitted from the terminal in the buffer from when the receiver receives the first indication until the receiver receives the second indication,
  wherein the first indication is an indication transmitted from the session management apparatus when it is determined that switching from a source user plane apparatus to a target user plane apparatus is performed, and
  wherein the second indication is an indication transmitted from the session management apparatus after completion of move of a context, and
a session management apparatus configured to transmit the first indication and the second indication to the user plane apparatus.

4. A buffer method executed by a user plane apparatus, comprising:
receiving, from a session management apparatus, a first indication indicating to store data transmitted from a terminal in a buffer; and
receiving, from the session management apparatus, a second indication indicating to end storing data transmitted from the terminal in the buffer,
wherein the first indication is an indication transmitted from the session management apparatus when it is determined that switching from a source user plane apparatus to a target user plane apparatus is performed,
wherein the second indication is an indication transmitted from the session management apparatus after completion of move of a context, and
wherein the user plane apparatus stores data transmitted from the terminal in the buffer from when receiving the first indication until receiving the second indication.

* * * * *